(12) United States Patent
Lyons et al.

(10) Patent No.: US 6,413,079 B1
(45) Date of Patent: Jul. 2, 2002

(54) VOICE ACTIVATED FIREPLACE CONTROL SYSTEM

(75) Inventors: David Charles Lyons, Red Wing; Gary Lee Butler, Silver Lake, both of MN (US)

(73) Assignee: Heat-N-Glo Fireplace Products, Inc., Lakeville, MN (US)

( * ) Notice: Subject to any disclaimer, the term of this patent is extended or adjusted under 35 U.S.C. 154(b) by 0 days.

(21) Appl. No.: 09/545,732

(22) Filed: Apr. 10, 2000

(51) Int. Cl.[7] ............................. F24C 3/00; G10L 11/00
(52) U.S. Cl. ..................... 431/125; 126/512; 236/51; 704/275
(58) Field of Search ............................. 431/125, 12, 2, 431/18, 89; 126/512, 500; 704/246, 231, 200, 270, 275; 236/90, 91 R, 91 F, 51

(56) References Cited

U.S. PATENT DOCUMENTS

| | | | | |
|---|---|---|---|---|
| 4,448,035 A | * | 5/1984 | Moriyama et al. | 62/176.6 |
| 5,450,841 A | * | 9/1995 | Whitaker et al. | 126/512 |
| 5,615,380 A | * | 3/1997 | Hyatt | 345/520 |
| 5,654,813 A | * | 8/1997 | Whitworth | 126/512 |
| 5,890,485 A | * | 4/1999 | Shimek et al. | 431/125 |

FOREIGN PATENT DOCUMENTS

| | | | |
|---|---|---|---|
| GB | 2 022 241 A | * | 12/1979 |
| JP | 62-194109 A | * | 8/1987 |
| JP | 9-152129 A | * | 6/1997 |
| JP | 2000-86155 A | * | 3/2000 |

* cited by examiner

*Primary Examiner*—Henry Bennett
*Assistant Examiner*—Josiah C. Cocks
(74) *Attorney, Agent, or Firm*—John B. Sowell-Aty

(57) ABSTRACT

Gas fireplaces are provided with commercially available gas valves that are similar to gas valves in furnaces and boilers. Such gas valves may be controlled manually, by thermostat or by solenoid valves which turn the fireplace burner ON and OFF and HIGH and LOW using a closed loop radio frequency transceiver system. The present invention provides an improved voice or sound actuated gas valve for fireplace burners.

In the preferred embodiment of the present invention, a microphone is coupled to a voice actuated electronic control module which converts analog sound signals to digital control signals. The sound may be music or other non-voice sounds employed to modulate the flames from the fireplace burner. Preferably the sounds are voice commands that are predetermined and preferably comprise a recognition command followed by an actuation command. Signals generated by the voice actuated electronic module are applied to a linear transducer coupled to a control regulation valve which may be inside or outside of a conventional modified or gas burner control valve. Further, a remote controller for generating sound signals that are used to maintain or control a desired temperature may be incorporated into the system without additional transceivers and closed loop systems.

16 Claims, 3 Drawing Sheets

VOICE ACTIVATED FIREPLACE CONTROL SYSTEM

BACKGROUND OF THE INVENTION

1. Field of the Invention

The present invention relates to prefabricated gas fireplaces that employ gas control valves. More particularly, the present invention relates to a novel natural language control module for controlling gas valves in gas fireplaces as well as other functions in gas fireplaces.

2. Description of the Prior Art

Heretofore, it was known that standard commercially available millivolt gas control valves could be modified to control their "On" or "Off" state by employing a remote transmitter which sent signals to a receiver at the gas control valve. The receiver activated the manual or electrical switch circuits in the gas valve causing the flow of gas to the gas burner system to go either "On" or "Off".

In our U.S. Pat. No. 5,890,485 issued Apr. 6, 1999 for a Dancing Flame Control System for Gas Fireplaces there is shown and described several systems for modulating the gas being supplied to a gas burner or burners of the fireplace to cause the height of the burner flames to vary with respect to time. This system produced a dancing flame by employing external solenoid control valves in the gas supply lines to the burner.

Remote control systems that control gas valves in a fireplace accomplish their desired functions but are very expensive. For example, gas fireplaces which now employ remote control systems and use remote transmitters and receiver/transmitter actuators at the fireplace, retail for more than two-hundred dollars. Such fireplaces are being marketed by Heat —N— Glo Fireplace Products, Inc. under the Model Number 6000TR as well as other models.

It would be desirable to maintain the desired remote control functions and to add more control functions to a fireplace while substantially reducing the price for remote transmitters and receiver/transmitters used in the above-mentioned remote control fireplaces.

SUMMARY OF THE INVENTION

It is a principal object of the present invention to eliminate the cost of conventional remote control transmitters and receiver transmitters used to control gas fireplaces and yet maintain or expand the control functions of the gas fireplace.

It is a principal object of the present invention to provide a microphone actuated voice responsive module which generates a plurality of control signals capable of operating any and all manual functions and controls of a gas fireplace.

It is a principal object of the present invention to provide a voice actuated or voice responsive module that generates control signals and responds to predetermined words in a manner that enhances understanding of the spoken words.

It is a principal object of the present invention to provide a voice actuated module with a sleep mode and a wake up command.

It is a principal object of the present invention to provide a two-stage voice responsive system for generating control signals comprising a recognition command followed by an activation command that is universal and not voice specific.

It is a principal object of the present invention to eliminate the need for battery operated remote controllers which fail, become lost or misplaced.

It is a general object of the present invention to provide a simple visual command recognition indicator associated with a voice recognition system.

It is another general object of the present invention to provide a novel fireplace that may be easily controlled by handicapped persons.

According to these and other objects of the present invention, there is provided a voice responsive system for controlling any and all electrical components and switches employed in a gas fireplace that enables any person to effect with voice commands those functions which could be operated manually or remotely heretofore.

DESCRIPTION OF THE PREFERRED EMBODIMENTS

Figure 1:
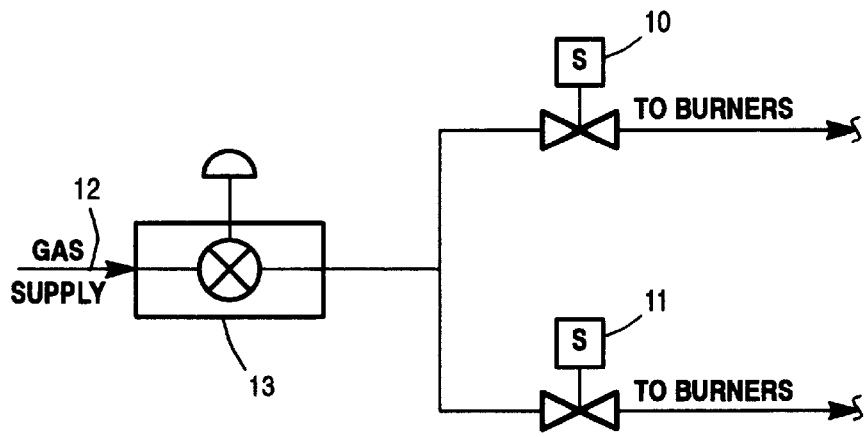
FIG. 1 is a schematic drawing showing a prior art solenoid control valve system used to control gas in a supply line to a burner or burners.

Refer now to FIG. 1 comprising a schematic drawing showing prior art solenoid control valves 10 and 11 connected in series with the main gas supply line 12 after passing through a conventional prior art gas control valve system 13. It is to be understood that such gas control valves are well known in this art and are manufactured by White Rogers, Robert Shaw, Honeywell, SIT Controls and others. While all valves made by those manufacturers are not identical, those skilled in the art can easily modify such gas control valves to operate in the system which will be explained hereinafter.

Figure 2:
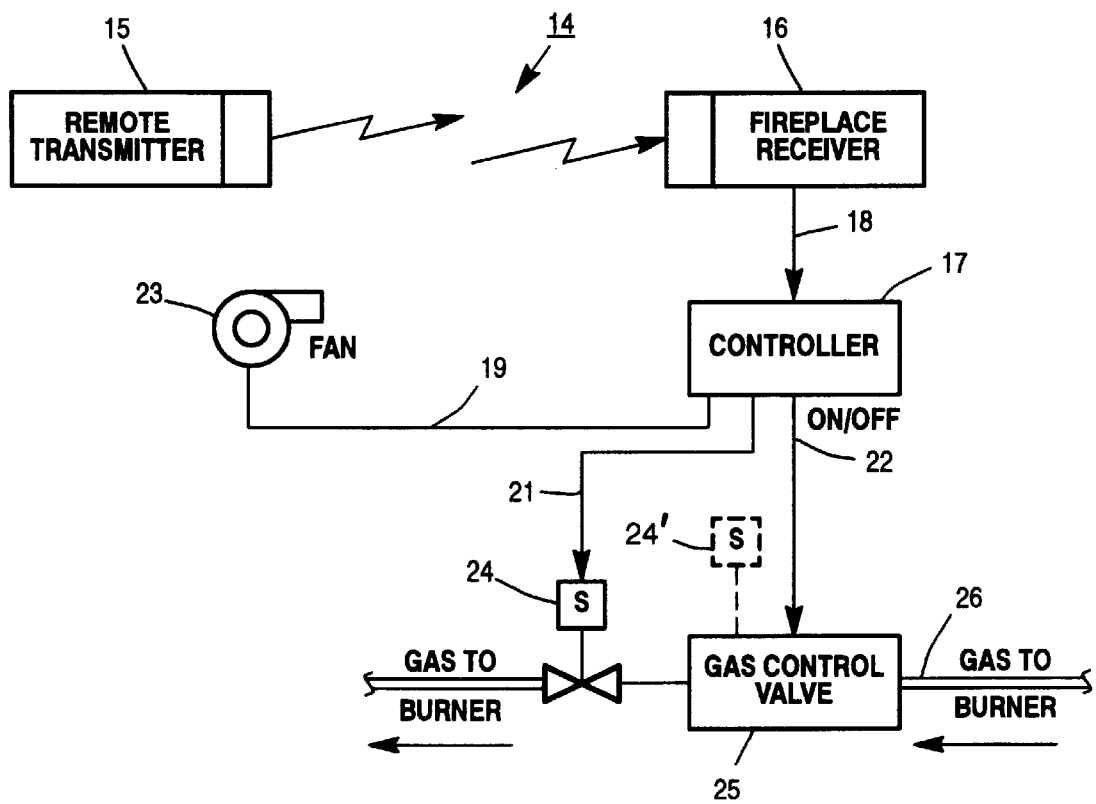
FIG. 2 is a block diagram showing the principal elements employed in a prior art remote control system used to control a gas fireplace.

Refer now to FIG. 2 showing a block diagram of the principal elements employed in a prior art remote control system 14 comprising a remote transmitter 15 and a receiver/transmitter 16 which is coupled to a controller or control module 17 by control wires 18. The control module 17 receives signals from the receiver 16, interprets them and generates output control signals on lines 19, 21 and 22, etc. as shown. The control line 19 is used to turn the fan 23 on or off. The control signal on line 21 is coupled to a solenoid 24 or 24' to control one of the valves shown and adjusts the gas supply on line 26 to either a high or low state as the signal commands. The signal on line 22 is coupled to the on/off gas control valve inside of valve 25, whereas the solenoid 24' is coupled to the regulator valve inside the gas control valve 25 and serves to adjust the gas flow through the valve.

Figure 3:
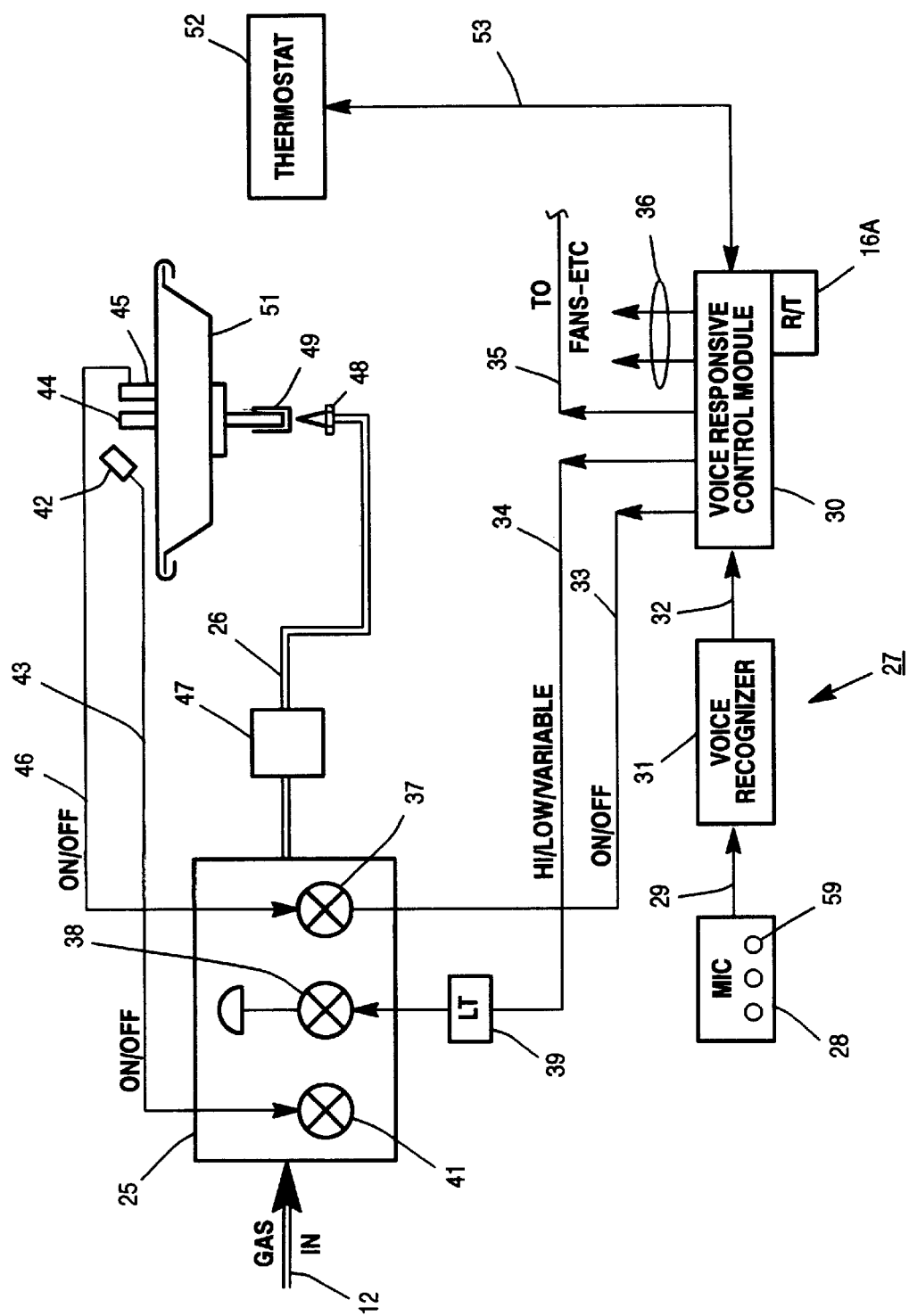
FIG. 3 is a schematic block diagram of the preferred embodiment voice activation system of the present invention for use in fireplaces having conventional gas control valves.

Refer now to FIG. 3 showing a schematic block diagram of a preferred embodiment voice activation system 27 for use in fireplaces 20 having convention gas control valves 25. The voice activation system 27 comprises microphone means, etc. which produces a digital output on line 29 to a novel voice recognizer 31 which produces control signals or interpretation recognition signals on line 32 to a voice responsive control module 30. In turn, the control module 30 produces the appropriate signals on lines 33 through 36 in a format to be used by the fireplace system. For example, the signal on line 33 will open or close an internal on/off valve 37 inside of the gas control valve 25. Similarly, the signal on line 34 is appropriate for opening or closing the regulator control valve 38 but is shown being applied to a linear transducer 39 so as to maintain continuous control of the regulator valve 38 without having to produce an on/off step operation. The on/off valve 41 is a safety valve coupled to a thermocouple 42 via line 43. The thermocouple sensor 42 will cause valve 41 to shut down if the pilot light 44 is not producing sufficient heat to actuate the sensor 42. There is shown a thermopile 45 coupled by line 46 to the aforementioned regulator valve 37 and serves a function that opens the valve 37 if there is enough heat being generated at the pilot 44 which will allow the burner to turn on. In the embodiment shown, a linear transducer 39 is added to the existing commercially available control valve so as to perform variable control of the regulator valve 38. In some commercially available gas control valves 25 it may be necessary to place the linear transducer and a control valve at the output shown at block 47. However, only one of the systems is required and the block 47 is optional to allow use of some makes of control valves.

Gas being supplied from the control valve 25 on line 26 is metered through nozzle 48 and shutter valve 49 and supplied to the burner 51 if the pilot light and system is operating. In the preferred embodiment of the present invention, a remote thermostat 52 may be installed at a place remote from the fireplace and burner 51 and a bi-directional line 53 may be coupled to the voice responsive control module 30 which is inside the enclosure of the fireplace (not shown). In this event, the system is capable of being operated by a remote thermostat as well as being controlled by the voice recognition system 27 and does not require a remote transmitter and/or remote receiver/transmitter as shown in FIG. 2. However, if it is not possible to wire a remote thermostat 52 to the voice responsive control module the system may be used by connecting a receiver/transmitter 16A to the control module 30 as explained hereinbefore with reference to FIG. 2. The main advantage to the system shown in FIG. 3 is its ease of operation even by those that are handicapped or impaired and the elimination of cost of the expensive remote transmitter and transmitter/receiver control system shown in FIG. 2. Thus, it is not expected that the buyer of a new home would have to employ the system shown in FIG. 2 knowing that a fireplace would be installed as original equipment.

Figure 4:
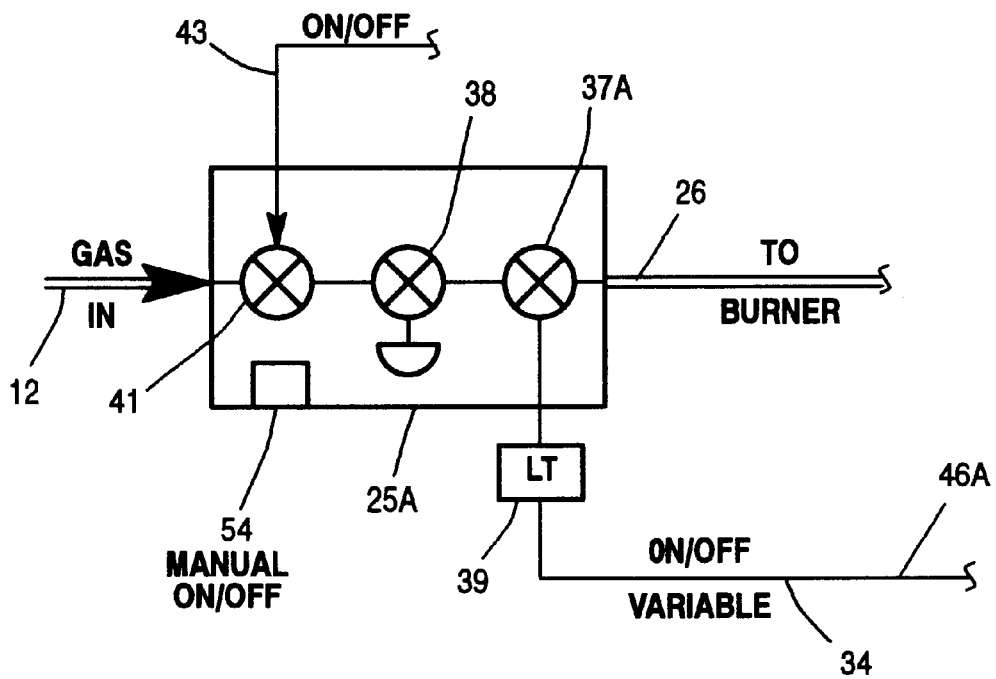
FIG. 4 is a schematic block diagram of a preferred embodiment gas control valve which comprises a further modification of the gas control valve shown in FIG. 3.

Refer now to FIG. 4 showing a schematic block diagram of a further modified gas control valve 25A. In this embodiment the original on/off valve 41 and the regulator valve 38 are not changed and their function remains the same. However, the valve 37 shown in FIG. 3 is replaced by a new and improved valve 37A which is completely controlled by a linear transducer 39 integrated into the control valve 25A. Thus, the on/off function shown on line 46A may be incorporated into the signals on line 34 and the solenoid in the prior art valve 37 may be removed. Further, the thermopile 45 and the signal line 46 may be removed. In summary, it is now possible to incorporate additional functions into the valve 37 so as improve the system and allow the novel voice responsive control module 30 to perform all of its functions in an improved valve which offers on/off and variable control.

It will now be understood that the voice responsive control module 30 which produces control signals on lines 33 through 36 is capable of operating any of the prior art gas control valve functions in a valve 25 as well as controlling via lines 35 and 36 the aforementioned blower fan 23 as well as any fan that may be located at a remote location (not shown).

Fans used at remote locations to remove heat from the fireplace or to dump heat to an outside location are shown and described in our U.S. Pat. No. 6,019,099 issued Feb. 1, 2000 for a Heat Removal System for Fireplaces which is incorporated herein by reference.

Figure 5:
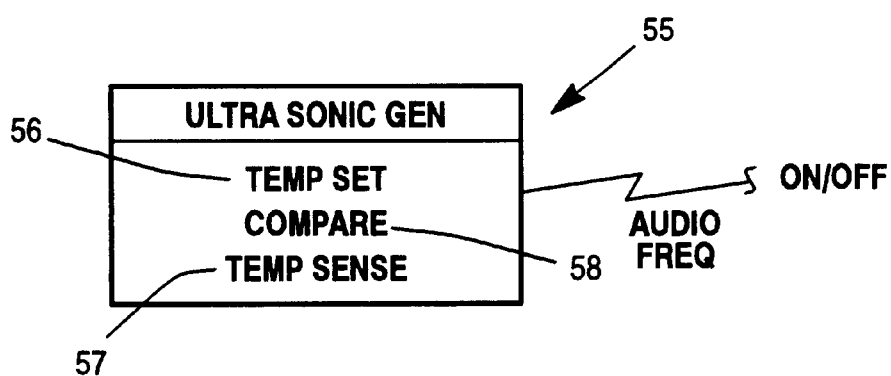
FIG. 5 is a schematic representation of a remote sound generator for use with the system shown in FIG. 3.

Refer now to FIG. 5 showing a schematic representation of a preferred embodiment remote sound generator for use with the system shown in FIG. 3. The remote generator 55 preferably comprises an ultrasonic generator or electronic noise generator which can produce distinctive tones that may be recognized by the microphone 28. The generator 55 produces sounds which cause the system 27 to recognize a signal commanding the aforementioned up/down and on/off functions as an audio signal. In a preferred embodiment, means for setting a preferred temperature is provided at input 56 and a temperature sensing device such as a digital thermometer 57 is provided to sense the temperature at the remote unit 55. A comparison device 58 is provided in the internal system and determines whether the temperature being sensed is above or below the set temperature and for activating the ultrasonic generator 56 to produce an incremental signal to the microphone 28 at the fireplace system which will increase in steps the amount of heat or decrease the amount of heat being produced by the fireplace.

In the following Table 1 there is provided a list of functions which are to be performed by the voice activation system. For example, it is desired to be able to turn the burner 51 on or off as well as to adjust the flame by adjusting the amount of gas being supplied on line 26. It is further desirable to be able to cause the flames to move up and down in a modulation effect which simulates a natural flame condition. It is also desirable to be able to effect the other five listed functions which are self-explanatory in a manner which enhances the ease of operation of the system 27.

TABLE 1

FUNCTIONS

Burner ON or OFF
Flame Adjustment
Flame Variation
Thermostat Control
Heat Removal or Pump
Electric Embers ON or OFF
Sound Control Flame
Manual Bypass This can be effected by dividing the command functions into two steps or stages, the first of which is a recognition command and the second or subsequent command following the recognition command is an activation command. For example, refer to Table 2 showing two columns of commands, one labeled a Recognition Command and the other labeled an Activation Command. When the wake up command is received at the system 27, the system resets itself for subsequent commands. When the fireplace command is given, the recognition system 27 acknowledges the recognition of the word fireplace by a light such as light 59 on the microphone which can be a colored LED, thus informing the operator that the word fireplace has been recognized. Once the fireplace command is recognized, it may be followed by the six activation commands shown opposite the word fireplace in Table 2. These terms are self-explanatory and carry out the functions shown in Table 1 without the requirement for learning the voice of the operator. It is apparent that other functions may be added and that the other lights in system 59 may be employed to further recognize the activation command so that the operator knows that the sequence of commands is completed and can expect the command function to have been carried out or be in the process of being carried out.

TABLE 2

| RECOGNITION COMMAND + ACTIVATION COMMAND | |
|---|---|
| WAKE UP | |
| Fireplace | ON |
| Fireplace | OFF |
| Fireplace | HI/UP |
| Fireplace | LOW/DOWN |
| Fireplace | DANCE |
| Fireplace | SOUND |
| Thermostat | HI + HI + HI |
| Thermostat | LOW + LOW + LOW |
| Thermostat | SET+ |
| Heat | OUT |
| Heat | ROOM(S) |
| Embers | ON |
| Embers | OFF |
| Manual | ON |
| Manual | OFF |
| Wakeup | — |

Having explained the preferred embodiment of the present invention, it will now be understood that transmitters and receivers which use infrared and radio frequency signals are quite expensive and can be completely eliminated when building new fireplaces into new houses. However, it is still possible to eliminate a substantial amount of the cost associated with remote transmitters and transmitter/receivers that are now being used in fireplaces presently being installed. Thus, it can be expected that the ease of operation and additional functions may be incorporated into future fireplaces at reduced cost to the consumer. The voice activation system 27 which comprises recognizer 31 and responsive control 30 may be incorporated into a single chip or controller unit 30, 31.

What is claimed is:

1. A system for controlling a gas burner for a prefabricated gas fireplace, comprising:
    a multi-element gas control valve mounted in said gas fireplace for regulating gas to said gas burner,
    adjuster means coupled to one of said elements forming an externally adjustable valve,
    a controller module for generating control signals coupled to said adjustable valve,
    a microphone means for receiving predetermined words or sounds and producing digital signals indicative of said words and sounds,
    a voice recognizer coupled to said microphone means and to said controller module for determining the meaning of said predetermined words and sounds and for producing command signals, and
    said command signals being coupled to said adjustable valve comprising signals for controlling the flow of gas to said burner in response to spoken words, thereby substantially eliminating the need for manual controls and/or bi-directional remote controllers.

2. A system as set forth in claim 1 wherein said controller module comprises means for responding to words recognized and for generating said command signals, some of said control signals being coupled to said adjustable valve in said gas control valve for varying the flow of gas to said gas burner.

3. A system as set forth in claim 2 wherein said adjustable valve comprises a transducer for variably regulating the flow of gas to said gas burner.

4. A system as set forth in claim 3 wherein said adjustable valve comprises at least ON, OFF and variable settings.

5. A system as set forth in claim 3 wherein said controller module is programmed to set or adjust said adjustable valve to ON and OFF setting in response to the spoken words ON and OFF.

6. A system as set forth in claim 1 wherein said command signals are generated in response to predetermined spoken words, and
    visual indicator means at said fireplace for indicating that predetermined words of said spoken words have been recognized by said voice recognizer.

7. A system as set forth in claim 6 wherein said predetermined spoken words comprise two parts having a recognition command and an activation command.

8. A system as set forth in claim 3 wherein said transducer comprises a linear transducer, and
    said controller module being programmed to generate incremental movement in response to High or Up or Low or Down spoken commands.

9. A system as set forth in claim 1 wherein said gas control valve comprises an external auxiliary valve for controlling the flow of gas to said burner in response to spoken words or sounds, thereby eliminating the need for modification of commercially available gas control valves.

10. A system for controlling a gas burner for a gas fireplace, comprising:
    a gas burner for use in a fireplace, multi-element gas valve control means for regulating the flow of gas to said gas burner,
    adjuster means coupled to one of said elements forming an externally adjustable valve, and
    a voice activation system for generating control signals for controlling said adjustable valve of said gas valve control means in response to spoken words or sounds.

11. A system as set forth in claim 10 wherein said voice activation system comprises a microphone for receiving spoken words and sounds, a voice recognizer and a voice responsive controller for generating said control signals for controlling said gas valve control means.

12. A system as set forth in claim 11 which further includes a thermostat coupled to said voice responsive controller for maintaining a temperature set on said thermostat.

13. A system as set forth in claim 12 wherein said thermostat is hard wired to said voice responsive controller.

14. A system as set forth in claim 12 wherein said thermostat is a remote thermostat adapted to maintain its set temperature by transmitting sounds to said voice activation system.

15. A system as set forth in claim 14 wherein said remote thermostat comprises means for generating sounds recognizable by said voice activation system.

16. A method for controlling a gas burner in a gas fireplace comprising the steps of:
    coupling said burner to a gas source controlled by a gas multi-element control valve,
    coupling adjustor means to one of said elements forming an externally adjustable valve,
    providing a voice responsive control module having output signals,
    coupling said output signals to said adjustor means of said gas control valve to control the flow of gas to said burner,
    said voice responsive control module comprising a voice recognizer coupled to said voice responsive control module,
    coupling microphone means to said voice recognizer, and
    controlling said gas control valve using predetermined words recognized by said voice recognizer.

* * * * *